United States Patent [19]

Martin

[11] Patent Number: 4,676,462

[45] Date of Patent: Jun. 30, 1987

[54] AIRCRAFT EJECTION SEATS

[75] Inventor: James W. Martin, Beaconsfield Bucks, England

[73] Assignee: Engineering Patents & Equipment Limited, St. Peter, United Kingdom

[21] Appl. No.: 796,101

[22] Filed: Nov. 7, 1985

[30] Foreign Application Priority Data

Nov. 22, 1984 [GB] United Kingdom ................ 8429509
Nov. 28, 1984 [GB] United Kingdom ................ 8429997

[51] Int. Cl.$^4$ ............................................. B64D 25/04
[52] U.S. Cl. .............................. 244/122 AG; 297/216; 297/466
[58] Field of Search ............ 244/122 R, 122 AG, 297; 297/464, 478, 481, 466; 280/733, 753

[56] References Cited

U.S. PATENT DOCUMENTS

| 2,829,850 | 4/1958 | Culver | 244/122 AH |
| 3,083,938 | 4/1963 | Brinkworth et al. | 244/122 AH |
| 3,214,117 | 10/1965 | James et al. | 244/122 A |
| 4,081,156 | 3/1978 | Ideskar | 244/122 AG |
| 4,215,835 | 8/1980 | Wedgwood | 244/122 AG |
| 4,359,200 | 11/1982 | Brevard et al. | 244/122 AG |

FOREIGN PATENT DOCUMENTS

| 2332177 | 6/1977 | France | 244/122 AG |
| 1570283 | 6/1980 | United Kingdom | 244/122 AG |

*Primary Examiner*—Joseph F. Peters, Jr.
*Assistant Examiner*—Jesûs D. Sotelo
*Attorney, Agent, or Firm*—Spencer & Frank

[57] ABSTRACT

An arm restraint system for an aircraft ejection seat comprises triangular nets, each secured at one of its corners to a respective upper point on the side of the seat back and at another of its corners to a respective lower point on the side of the seat back. The remaining corner of each net is secured to one end of a respective retraction line which passes through a respective reversing arrangement at the front of the respective side wall of the seat, along a respective conduit extending along the side of the seat, to gas-powered line-retraction device mounted in the seat back. In the normal position, each line, from its point of attachment to the net, extends through an eye provided on a respective projectile carried by the seat. When an ejection sequence is initiated, the projectiles are thrown transversely outwardly from the seat back and the lines retracted to pull the outwardly thrown ends of the nets forwardly to pass on the outside of the airman's arms and restrain the airman's arms from moving outwardly during ejection of the seat from an aircraft.

12 Claims, 5 Drawing Figures

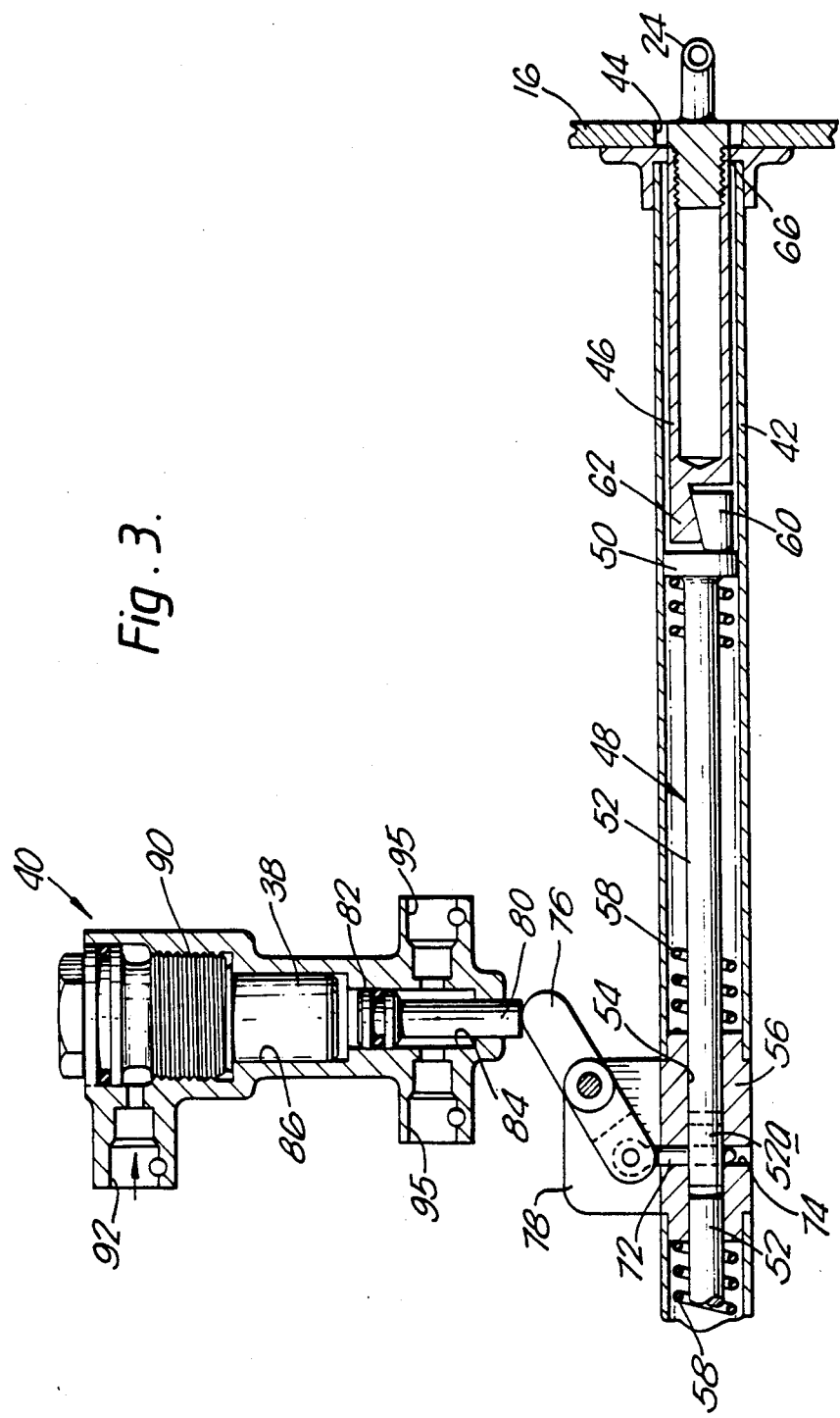

4,676,462

AIRCRAFT EJECTION SEATS

FIELD OF INVENTION

This invention relates to aircraft ejection seats and, more particularly to the provision, on such seats, of limb restraining means which, whilst leaving the limbs of the airman using the seat relatively free during normal flight, operates, when the seat is ejected from the aircraft, to hold the respective limb or limbs firmly to avoid its or their violent displacement by powerful air blasts when the seat and airman are ejected into the airstream around the aircraft, the respective limb or limbs being released, however, preparatory to the airman leaving the seat after ejection of the seat.

BACKGROUND

It is known to provide such limb restraining means which require the airman to carry out a positive act to connect his limbs to restraining members carried by the aircraft ejection seat, for example to attach straps or rings on his flying suit to appropriate fitments provided on the seat, such connection being carried out on a routine basis before each flight. However such restraining means, herein termed "active restraining means" because they require a course of action on the part of the airman to ensure that the restraining means will be in a condition to operate in the event of ejection of the seat, carry the risk that the requisite action on the part of airman may accidentally be omitted. Furthermore, the necessity for such positive action adds to the time which must elapse between the airman first entering the aircraft and his being fully operationally installed therein.

It is among the objects of the present invention to provide a limb restraint system for an aircraft ejection seat which is capable of operating to restrain the limbs of an airman seated in the seat, in an ejection situation, without requiring any prior connection of the airman's limbs or of parts of his flying suit etc. to fitments on the ejection seat.

SUMMARY OF INVENTION

According to one aspect of the invention there is provided a limb restraint system for an ejection seat including at least one restraining member normally retained in a stowed position on the seat without being connected with the limbs of the occupant of the seat, and means operable automatically, on initiation of an ejection operation, to extend said restraining member to an extended position restraining a limb or limbs of the occupant of the seat from movement in a least a predetermined direction relative to the seat.

According to a further aspect of the invention there is provided an ejection seat having a back and a seat structure extending forwardly from the back in the region of the bottom of said back, the ejection seat having an arm restraining member in the form of a net or flexible fabric member having an upper point secured to the seat back on the exterior thereof, at least a fixed lower point secured to the seat back and a further point secured to a flexible line extending from said further point to line take-up or reversing means at the front of said forwardly extending seat structure whereby the arm restraining member can be pulled into an extended position in which said further point lies adjacent the front of said forwardly extending seat structure by pulling said line, the arm-restraining member normally being retained in a stowed position along an outer side of said seat back.

An embodiment of the invention is described below, by way of example, with reference to the accompanying drawings.

BRIEF DESCRIPTION OF DRAWINGS

In the drawings:

FIG. 3 is a schematic fragmentary view showing part of an operating mechanism of the seat of FIG. 1.

DESCRIPTION OF PREFERRED EMBODIMENT

Figure 1:
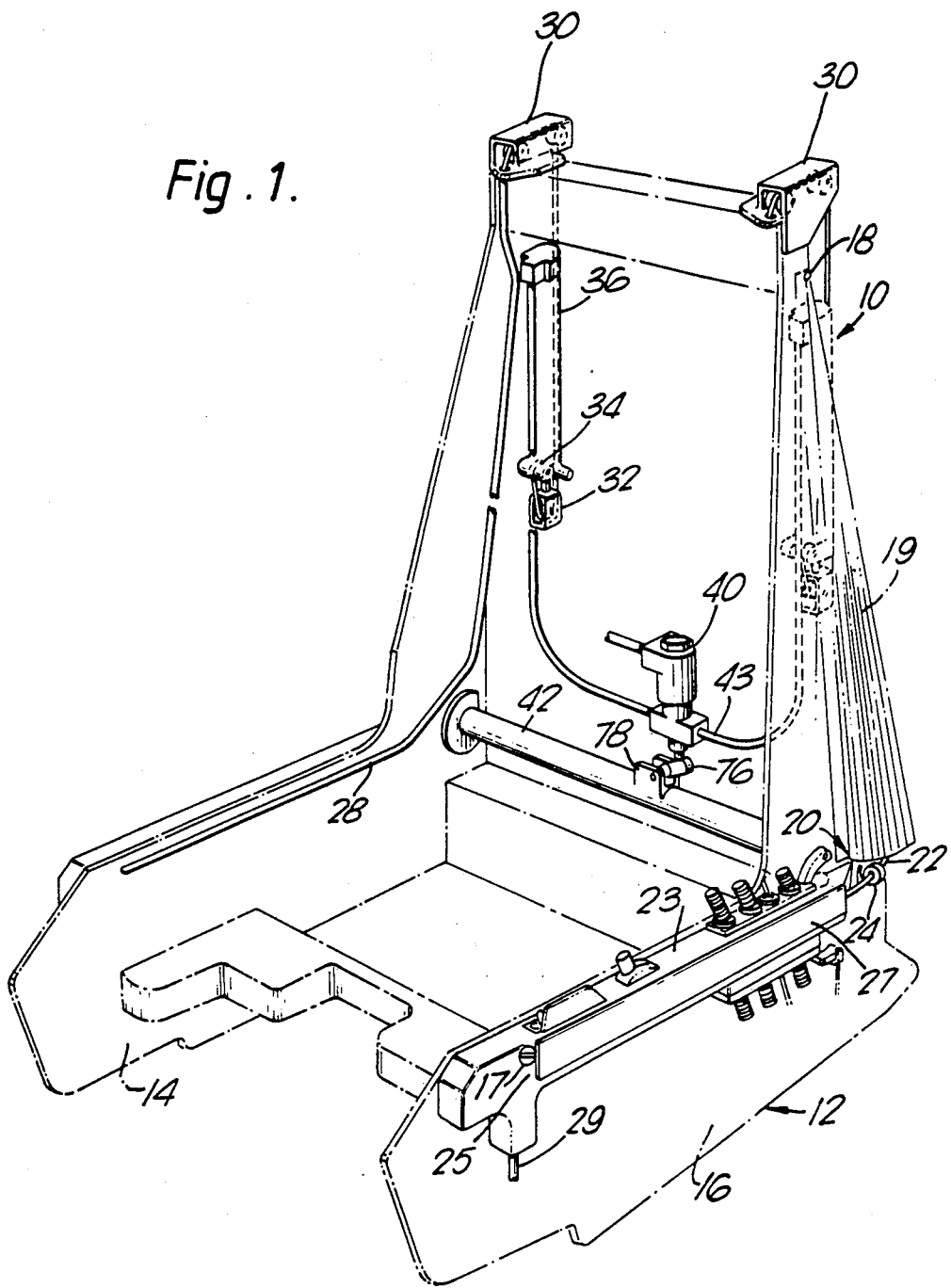
FIG. 1 is diagrammatic prespective view of an ejection seat embodying the invention.

Referring to FIG. 1, an aircraft ejection seat comprises a seat bucket, shown only schematically, in broken lines, which has a back 10 and a base structure 12 extending forwardly from the bottom of the back 10. In the seat shown, the seat back 10 and base structure 12 have respective side walls 14, 16 on each side of the seat. As shown, the side wall 14 and side wall 16 on each side of the seat are formed by a single L-shaped piece of metal sheet with the plane of the sheet disposed substantially vertically. Attached to each side of the seat is a respective arm-restraining member in the form of a flexible net 9.

Each arm restraining member is part of a respective combination of elements, such a combination being provided on each side of the seat, for restraining the respective arm of the airman using the seat. For ease of description such a combination is described below in the singular, although FIG. 1 shows different parts of the respective, duplicate combinations, but it will be appreciated that the description applies equally to the combination on each side of the seat.

An upper part of the net is secured, in a manner not shown in detail, at a point 18 to the side wall 14 adjacent the upper end of the seat back. A lower edge of the net, at one end thereof, is secured to the respective side wall (14, 16) of the seat at a location indicated at 20 and the other end 21 of such lower edge of the net is secured to one end of a flexible cord or line 22. The net is stowed within a fabric cover 19 releasably secured by a hook-like fabric fastener, such as that sold under the Registered Trade Mark "Velcro". The line 22 extends forwardly from the net, through an eye 24 and generally horizontally along the outer side of the side wall 16 through a reversing means, (indicated schematically at 17) adjacent the forward end of the base structure 12 from whence the line is led rearwardly again, for example along the inner side of the respective side wall 16, as shown, within a conduit 28 which is lined with PTFE to reduce friction. The conduit 28, in the region of the back of the seat, is bent upwardly to extend to a respective extension bracket 30 where the conduit 28 terminates. The extension bracket 30 is mounted at the top of the seat bucket, on the respective side of the seat. The line 22 emerges from the respective conduit 28 in the respective bracket 30 and passes over pulleys or PTFE fairleads mounted within the bracket 30, from whence the line 22 extends vertically downwardly, behind the back of the seat bucket, to a pulley mounted within a bracket 32, the line 22, after passing under the last-mentioned pulley, being secured at 34 to a cylinder 36 fixed to the rear of the seat bucket. The bracket 32 is carried at the lower end of a piston rod which extends downwardly from a piston, (not shown) slidable within cylinder 36 and projecting from the lower end of the cylinder. Movement of the piston and piston rod downwardly from the cylinder 36 will thus pull the line 22 through the conduit 28.

Figure 2:
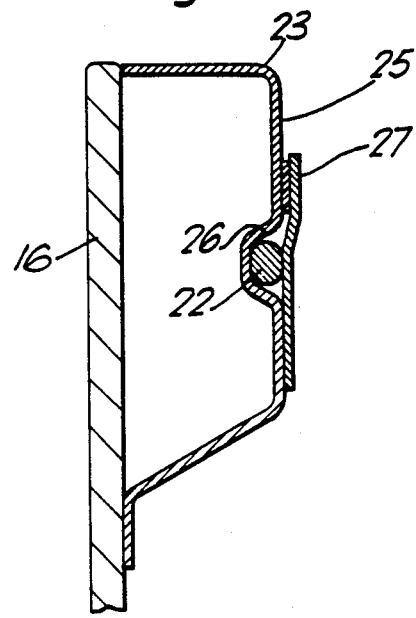
FIG. 2 is a sectional view of a detail of the seat of FIG. 1.

In the embodiment shown, connector devices for various service conduits and leads associated with the airman's personal equipment, and various control devices, are mounted on the outer side of the side wall 16. These connector and control devices are conveniently covered by a fairing 23 (see also FIG. 2) which provides a generally flat, vertical outer wall 25 in which is formed, intermediate its upper and lower edges, a horizontal longitudinally extending line trough or shallow channel 26 in which the portion of the line 22 extending from the eye 24 to the line reversing means 17 is normally accommodated, this portion of the line 22 being held in place by a cover strip 27 secured to the wall 25 by readily releasable means such as a hook-pile fastener of the kind sold under the Registered Trade Mark "Velcro".

The line reversing means incorporates a line snubber, the function of which is to allow the line 22 to pass freely therethrough when the line is being drawn in by downward movement of the respective bracket 32 but which will prevent passage of the line in the opposite direction. A guillotine (not shown) is provided for severing the line 22 at a position between the line snubber and the entry to the conduit 28, whereby the arm restraining net may be released at the appropriate time after ejection of the seat/airman combination when an automatically operated device functions to allow release of the airmen, with his parachute, from the seat. In the embodiment illustrated the guillotine is gas-operated by means of gas supplied via a line 29 from a pyrotechnic device.

Mounted transversely within the seat bucket, adjacent the lower end of the back of the seat and extending between the two side walls 14, 16 is a tube 42, each end of the tube being open and communicating with corresponding opening 44 (see FIG. 3) formed in the respective side wall 14, 16. Mounted within the tube 42, at each end thereof, is a respective projectile or carrier member 46, for example in the form of a cylindrical body of nylon, the end of which projects from the end of the tube and from the outer side of the side plate 14, 16 and is formed as the respective eye 24. Associated with each projectile 46 is a respective ram 48 mounted within the tube 42, each ram having a head 50 formed as a close sliding fit within the tube 42, and a shank 52 of reduced diameter extending from the head 50 towards the middle of the tube 42 to pass, as a close fit, through a bore 54 in a block 56 which forms the central part of the tube 42. A respective compression spring 58 encircles the shank 52 and acts between the head 50 and a respective abutment provided by the block 56. A release mechanism, to be described, normally holds the rams 48 in retracted positions thereof with the springs 58 being under compression. However, when the rams 48 are released by the release mechanism, each ram 48 is thrust transversly outwardly by the respective spring 58, projecting the respective projectile 46 from the respective end of the tube 42 so that the end of the respective net secured to the respective line 22 is drawn transversely outwardly from the seat, whilst the associated fabric cover 19 is detached from the seat and thereby opened. Each ram 48 and the adjacent projectile 46 have cooperating dovetail-shaped formations 60 and 62 respectively which provide respective mating faces substantially inclined with respect to the longitudinal axis of the tube 42 and prevent axial separation of the projectile 46 from the ram 48 so long as the dovetail formations 60, 62 are within the tube 42, (since such separation can only be effected by a measure of movement of the projectile 46 transversely relative to the axis of the tube 42 and such movement is prevented by the walls of the tube 42 whilst the projectile is still within the tube). However, when the formation 60 and the projecticle 46 have been thrust fully from the tube 42 there is no longer any connection between the projectile and the ram 48, to that the projectile is free to fly outwardly and forwardly whilst the ram 48 is retained in the tube by retaining means. This retaining means may, for example, comprise an abutment 66 provided at the end of the tube 42 and adapted for engagement with an abutment face of the head 50 of the ram.

Figure 4:
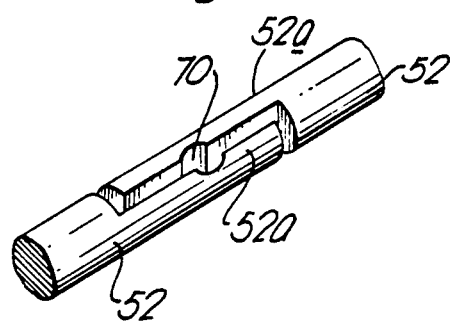
FIG. 4 is a perspective view illustrating a detail of the mechanism of FIG. 3.

The inner ends of the shanks 52 of the two rams 48 are, as shown in FIG. 4, cut away so that each is of substantially semi-cylindrical form, the two semi-cylindrical inner end portions 52a of the two rams 48 being arranged with their flat diametral faces mating with one another so that they together form, externally, a cylindrical continuation of the respective shanks 52 fitting snugly within the bore 54. Each portion 52 has a notch 70 formed in its diametral face, the notch 70 extending diametrally across the ram so that in the normal, retracted position of the rams the two notches 70 together form a diametral passage through the composite cylindrical body formed by the end portions of the two rams 48. The release mechanism includes a sear or detent 72 (FIG. 3) which extends through the last-noted diametral passage and through an aligned transverse passage 74 in the block 56, so that when the sear or detent 72 is withdrawn, both rams 48 are released simultaneously.

The sear 72 is pivotally connected to one end of a lever 76 which in turn is pivotally connected between plates 78 extending from the block 56. A unit 40 is fixed to the seat back and a piston 82 is sealingly slidably mounted within a cylinder 84 formed within the unit 40. A piston rod 80 extends from piston 82 and projects form the lower end of the unit 40. The other end of the lever 76 is acted on, in an ejection situation, by the projecting lower end, of the piston rod 80. The upper end of the cylinder 84 within the unit 40 is in communication with an enlarged bore 86 forming a breech which accommodates a cartridge 38. The cartridge 38 is fired by a percussion device (not shown), arranged to be acted on by a gas-pressure operated firing mechanism (not shown) accommodated within an insert 90 screwed into the upper end of the breech. In operation, gas under pressure is supplied to the firing mechanism within insert 90 by way of a port 92 connected with a pyrotechnic seat initiator device (not shown) which is activated at the beginning of an ejection sequence. Two conduits 43 are connected with respective ports 95 which communicate transversely with the cylinder 84 intermediate the ends thereof. When the cartridge 38 is fired, the piston 82 and piston rod 80 are first thrust downwardly to pivot the lever 76 and withdraw the sear 72 and only after the piston 82 has passed downwardly below the ports 95 are the latter placed in gas communication with the upper portion of the chamber 84 and the chamber 86 whereby gas produced by the combustion of the cartridge 38 may pass along the conduits 43. Each conduit 43 extends to the upper end of a respective cylinder 36, so that in operation the cylinders 36 are operated by gas produced by the firing of cartridge 38.

Figure 5:
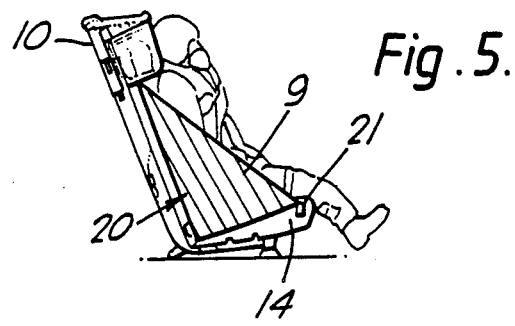
FIG. 5 is a side elevation view showing the seat, occupied by an airman and with the arm restraining means extended.

In operation, when an ejection operation is initiated and the cartridge 38 in the unit 40 consequently fired, the release mechanism is operated by the piston 82, withdrawing the sear 72 and allowing the rams 48 to throw the projectiles 46 transversely outwardly from the seat. Immediately afterwards, the pistons within the cylinders 36, supplied with gas from the cartridge 38, begin to move downwardly to draw the lines 22 rapidly through the conduits 28 and the respective line snubbers. The strips 27 are separated from the fairings 23 by the outward projection of the projectiles 46 and the respective ends of the respective nets, with the projectiles still attached, are drawn by the lines 22 rapidly forwardly, whilst still proceeding outwardly, so that each projectile and the end of the respective net attached thereto travels approximately in an outwardly convex arc from its normal position to the position of the respective line snubber. The arm restraining nets are thus thrown outwardly around the airman's arms before being drawn inwardly to restrain the same. FIG. 5 shows the extended arm-restraining net, indicated at 9, at this stage. The timing of this operation in relation to the rest of the ejection sequence is, of course, such that the airman's arms are restrained by the nets before the seat and airman are ejected from the aircraft.

Instead of the projectiles 46 being thrown transversely outwardly by the effect of springs 58, the projectiles 46 may be thrown transversely outwardly by gas under pressure produced by the firing of a cartridge or cartridges. In this case, the projectiles 46 may be formed as pistons sealingly slidable in respective tubes corresponding to tube 42 and acting as gun barrels, with the rams 48 being dispensed with, or the rams 48 may be formed as such pistons, (with the springs 58 being, of course, dispensed with).

I claim:

1. In an ejection seat having a back which has an exterior and a seat structure extending forwardly from the back in the region of the bottom of said back; an arm restraining member in the form of a flexible fabric member having an upper point, a fixed lower point and a movable further point; means securing said upper point to the seat back on the exterior thereof; means securing said fixed lower point to the seat back at a position below said upper point; a flexible line; line take-up means at the front of said forwardly extending seat structure; means securing said further point to said flexible line, said flexible line extending from said movable further point to said line take-up means whereby said arm restraining member can be pulled into an extended position in which said further point lies adjacent the front of said forwardly extending seat structure by pulling said line; and means which normally restrains said arm-restraining member in a stowed position along an outer side of said seat back; the improvement wherein said ejection seat further includes a carrier member, thrust means for thrusting said carrier member transversely outwardly from the seat upon initiation of an ejection operation, before said line is pulled, means connecting said further point with said carrier member whereby when said thrust means is operated, and said line is pulled up to said take-up means, said further point is caused to proceed in an outwardly convex arc from the lower region of the seat back to the front of said forwardly extending structure when seat ejection is initiated.

2. The ejection seat of claim 1 wherein said carrier member is disconnected from the seat, apart from its connection with said further point, when thrust transversely outwardly from the seat.

3. In an ejection seat having a back which has an exterior and a seat structure extending forwardly from the back in the region of the bottom of said back; an arm restraining member in the form of a flexible fabric member having an upper point, a fixed lower point and a movable further point; means securing said upper point to the seat back on the exterior thereof; means securing said fixed lower point to the seat back at a position below said upper point; a flexible line; line take-up means at the front of said forwardly extending seat structure; means securing said further point to said flexible line, said flexible line extending from said movable further point to said line take-up means whereby said arm restraining member can be pulled into an extended position in which said further point lies adjacent the front of said forwardly extending seat structure by pulling said line; and means which normally restrains said arm-restraining member in a stowed position along an outer side of said seat back; the improvement wherein said ejection seat further includes a carrier member, thrust means for thrusting said carrier member transversely outwardly from the seat upon initiation of an ejection operation, before said line is pulled, means connecting said line with said carrier member whereby when said thrust means is operated, and said line is pulled up to said take-up means, said further point is caused to proceed in an outwardly convex arc from the lower region of the seat back to the front of said forwardly extending structure when seat ejection is initiated.

4. The ejection seat of claim 3 wherein said carrier member is disconnected from the seat, apart from its connection with said further point, when thrust transversely outwardly from the seat.

5. In combination with an ejection seat having a back which has an exterior and having a seat structure extending fowardly from the back in the region of the bottom of said back, an arm restraint system disposed on said seat for restraining the arms of an occupant of said seat during ejection of said seat, said arm restraining system comprising a respective arm restraining member in the form of a flexible fabric member disposed on each side of said seat, each said arm restraining member having an upper point, a fixed lower point and a further point; respective means securing each said upper point to the said seat back on the exterior thereof at the respective side of said seat; respective means securing each said fixed lower point to the seat back at a position below the respective said upper point; a respective flexible line for each said flexible fabric member; respective line take-up means for each said line disposed at least in part at the front of said forwardly extending seat structure; means securing each said further point to the respective said flexible line, with each said flexible line extending from the respective said further point to the respective said line take-up means whereby the respective arm restraining member can be pulled into an extended position, in which said further point thereof lies adjacent the front of said forwardly extending seat structure, by pulling the respective said line; means for normally retaining said arm-restraining members in stowed positions along the respective outer sides of said seat back; a respective carrier member for each said arm restraining member; a carrier member guide tube secured to said seat back to extend transversely horizontally across said seat back, said guide tube having opposite end portions adjacent respective opposite sides of the seat, and each said carrier member being accommodated within a respective said end portion of said guide tube; respective means for connecting each said carrier member to the respective said line at a position adjacent the respective said further point; releasable thrust means for thrusting said carrier members transversely outwardly from said end portions of said guide tube, and thus from said seat, when said thrust means is released upon initiation of a seat ejection operation; and means, responsive to the initiation of a seat ejection operation, for releasing said thrust means before said lines are pulled by said take-up means to cause said further points to proceed in outwardly convex arcs from the lower region of said seat back to the front of said forwardly extending structure as said lines are pulled up by said line take-up means.

6. Aparatus as defined in claim 5 wherein: said thrust means includes compressed spring means, disposed within said guide tube, for urging each said carrier member in said transverse direction and out of the respective said end portion of said guide tube when released, and means, engaged by said means for releasing, for normally maintaining said spring means in compression; and said means for releasing is operable to release said means for maintaining to allow said spring means to simultaneously thrust both said carrier members outwardly from the respective said end positions of said guide tube.

7. Apparatus as defined in claim 6 wherein each said thrust means includes means for normally maintaining said carrier members in position in their respective carrier tube end portions and for releasing the respective said carrier members when they are thrust out of said guide tube.

8. Apparatus as defined in claim 6 wherein said means for releasing includes detent means movably mounted in said seat back for movement between a normal position wherein said detent means engages said thrust means and a release position wherein said detent means releases said means for maintaining to simultaneously cause said carriers to be thrust outwardly by said spring means.

9. Apparatus as defined in claim 8 wherein: said line take up means and said means for releasing are operable by gas pressure generated pyrotechnically; said means for releasing further includes a cylinder connected at one end with a cartridge firing chamber to receive combustion gases under pressure, a piston sealingly fitted in the cylinder and movable along the cylinder from a normal position to a release position in response to received combustion gases to move said detent means between its respective said normal and release positions; and said line take-up means is connected with said cylinder via port means in the wall of said cylinder located so that in said normal position of said piston, said firing chamber is cut off from said port means by said piston, but in said release position of said piston said port means lies between said piston and said firing chamber so that the combustion gases can operate said line take-up means but can do so only after release of said carriers.

10. Apparatus as defined in claim 5 wherein respective said thrust means are provided for each said carrier, with each said thrust means including a respective thrust member located within said guide tube inwardly of the respective said carrier member, and a respective spring acting between the respective said thrust member and a fixed abutment to urge the respective said thrust member in a direction toward the respective said carrier member; wherein each said thrust member has an end portion, remote from the respective said carrier member, which has a longitudinally extending surface which is shaped to accommodate the similarly shaped end portion of the other said thrust member so that the two said thrust members overlap along a longitudinally extending joint area, and in the area of the middle of said seat back, each said end portion further has a slot extending cross-wise across its said surface which defines, with the corresponding slot of the other said thrust member, a passage extending diametrally of said guide tube; and wherein said means for releasing includes a unitary detent member which normally extends within said passage, and which, when withdrawn from said diametral passage, simultaneously releases both said thrust members to move outwardly under the force of their respective said springs.

11. Apparatus as defined in claim 5 wherein: each said line take-up means comprises a line direction changing device disposed at said front of said forwardly extending seat structure and means for exerting a pull on the respective said line when operated, and each said line extends from said further point to and around the respective said line direction changing device to the respective said means for exerting a pull.

12. Apparatus as defined in claim 11 wherein each said means for exerting a pull is mounted in said seat back.

* * * * *